(No Model.)

J. OPDALE.
VEHICLE WHEEL.

No. 492,735. Patented Feb. 28, 1893.

Witnesses
Joseph C. Stack.
A. S. Chatfield.

Inventor
John Opdale.
By Francis L. Dyer
Attorney

UNITED STATES PATENT OFFICE.

JOHN OPDALE, OF DULUTH, MINNESOTA.

VEHICLE-WHEEL.

SPECIFICATION forming part of Letters Patent No. 492,735, dated February 28, 1893.

Application filed May 31, 1892. Serial No. 435,007. (No model.)

*To all whom it may concern:*

Be it known that I, JOHN OPDALE, a citizen of the United States, residing at Duluth, in the county of St. Louis and State of Minnesota, have invented certain new and useful Improvements in Vehicle-Wheels; and I do hereby declare the following to be a full, clear, and exact description of the invention, which will enable others skilled in the art to which it appertains to make and use the same.

The present invention relates to various new and useful improvements in metal wheels, which are especially adapted for use in connection with wheel-barrows, but which, with slight modifications, may be employed with other varieties of vehicles.

The objects which I seek to obtain by my present invention are to provide and produce a metal vehicle wheel, which can be manufactured very economically, which will be extremely durable in use, and in which the spokes will be kept always tight and rigid. To obtain these ends I construct my improved vehicle wheel, with a rim consisting of a flat circular band, preferably of iron, steel or other metal, to which the spokes are riveted so as to extend down on each side. These spokes at their free ends encircle the axle of the wheel, and are surrounded by two hubs, secured to said axle by nuts, in such a way that by moving the said axle inwardly, in the manner which I shall presently describe, the said spokes will be tightened more or less, whereby the wheel will be always kept firm and rigid.

Figure 1:
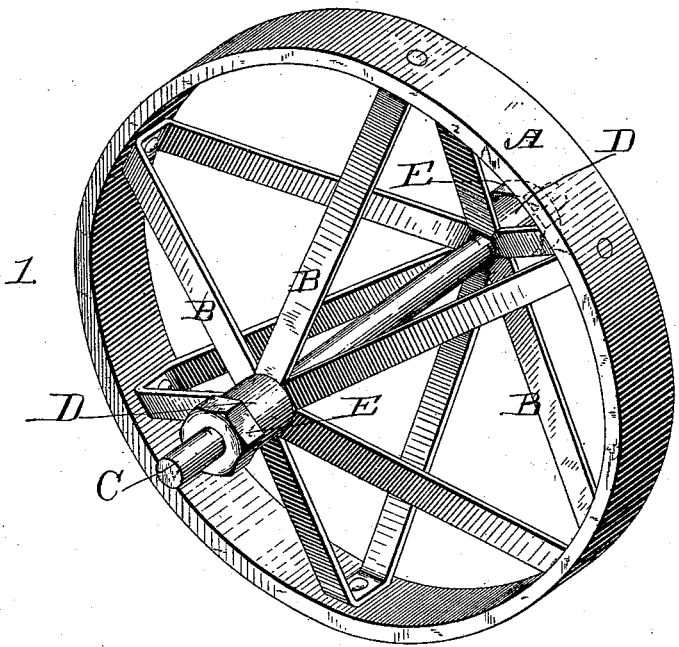
Figure 2:
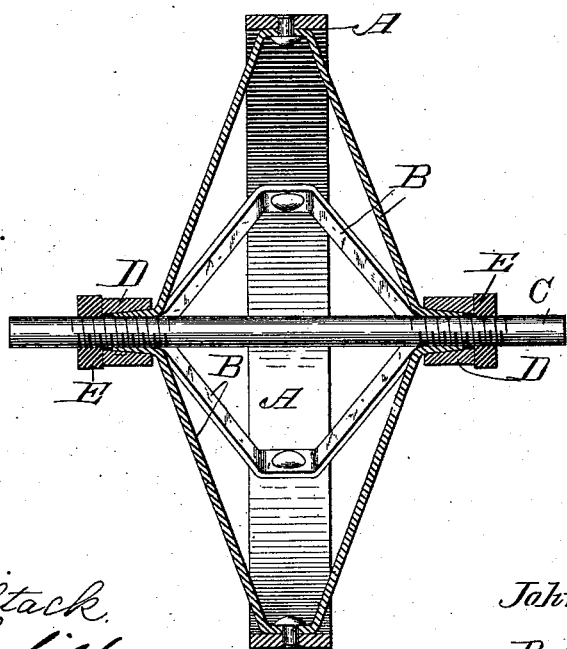

For a better comprehension of my invention, attention is directed to the accompanying drawings, forming a part of this specification and in which:

Figure 1 is a perspective view of a wheelbarrow wheel, made in accordance with my present invention, and Fig. 2 a sectional view of the same.

In both of the above views, corresponding parts are designated by identical letters of reference.

A. represents the rim of the wheel, which is preferably made of a flat piece of iron, steel or other metal, but it may be made in other ways, and of different material, such as wood.

B. B. are the spokes, which are made of flat metal, riveted to the under side of the rim, and extending down on each side thereof, in an inclined direction as shown. The lower or free ends of the spokes B. B. are bent off at an angle, and are beveled as shown, so as to fit snugly around the axle C.

D. D. are the hubs of the wheel, each of which is made of metal of an outer cylindrical form, and with an incline on its inner side, as shown in Fig. 2. These hubs D. fit on the axle C. over the bent portions of the spokes B.

E. E. are ordinary nuts, bearing against the outer portions of the hubs D. and each engaging with a threaded portion of the axle C. By screwing these nuts inwardly, the hubs D. will be forced against the spokes, so as to tend to throw the said spokes nearer together, thereby forcing the said spokes out against the rim of the wheel. In this way the wheel can be kept always firm and rigid, and by adopting the particular construction described, the wheel can not only be manufactured very cheaply, but may be taken apart for any desired purpose.

Having now described my invention, what I claim as new herein, and desire to secure by Letters Patent, is as follows:

An improved vehicle wheel, consisting of a flat rim A; spokes B, riveted thereto, and made of flat metal, the ends of said spokes, being bent inwardly, and tapered both in width and thickness, for the purposes mentioned; the hollow hubs, D, D, inclined on their interior, and surrounding said bent ends of the spokes; the screw-threaded axle C; and the nuts E, E, on said axle for engaging with said hubs, substantially as set forth.

JOHN OPDALE.

In presence of—
FRANK L. DYER,
A. C. CLARKE.